United States Patent [19]

Taniguchi et al.

[11] Patent Number: 5,419,109

[45] Date of Patent: May 30, 1995

[54] TIRE CORD OF POLYVINYL MULTIFILAMENT YARN

[75] Inventors: Atsushi Taniguchi, Ehime; Masaharu Mizuno, Matsuyama; Mitsuo Suzuki, Ehime, all of Japan

[73] Assignee: Toray Industries, Inc., Tokyo, Japan

[21] Appl. No.: 142,925

[22] Filed: Oct. 29, 1993

Related U.S. Application Data

[60] Division of Ser. No. 21,179, Feb. 22, 1993, which is a continuation of Ser. No. 829,551, Feb. 4, 1992, abandoned, which is a continuation of Ser. No. 360,695, Jun. 2, 1989.

[30] Foreign Application Priority Data

Jun. 2, 1988 [JP] Japan ................... 63-136285
Aug. 3, 1988 [JP] Japan ................... 63-194243

[51] Int. Cl.$^6$ .......................... D02G 3/02; D02G 3/36; B60C 9/00; B60C 9/18

[52] U.S. Cl. ............................ 57/237; 57/902; 152/451; 152/527; 152/556; 264/185; 525/57; 525/62

[58] Field of Search .................. 57/902, 237; 152/451, 152/527, 556; 525/57, 62; 264/185

[56] References Cited

U.S. PATENT DOCUMENTS

| | | |
|---|---|---|
| 2,169,250 | 8/1939 | Izard . |
| 3,395,529 | 8/1968 | Ray ........................... 152/359 |
| 3,736,311 | 5/1973 | Subramanian . |
| 4,599,267 | 7/1986 | Kwon et al. ............... 428/364 |
| 4,765,937 | 8/1988 | Hyon et al. ................ 264/185 |
| 4,971,861 | 11/1990 | Watanabe et al. . |

*Primary Examiner*—Paul R. Michl
*Assistant Examiner*—Patrick Niland
*Attorney, Agent, or Firm*—Armstrong, Westerman, Hattori, McLeland & Naughton

[57] ABSTRACT

A tire cord made of a multifilament yarn of polyvinyl alcohol having a degree of polymerization of at least 1500, the yarn having a tensile strength of at least 10 g/d and an index of hot water resistance of at least 50.

9 Claims, No Drawings

TIRE CORD OF POLYVINYL MULTIFILAMENT YARN

This is a division, of application Ser. No. 08/021,179 filed Feb. 22, 1993, allowed Aug. 17, 1993, which is a continuation of Ser. No. 07/829,551, filed Feb. 4, 1992, abandoned, which is a continuation of Ser. No. 07/360,695, filed Jun. 2, 1989, abandoned.

BACKGROUND OF THE INVENTION

The present invention relates to a polyvinyl alcohol multifilament yarn (abbreviated as PVA yarn hereinafter) and a process for producing the same. More particularly, it relates to a PVA yarn which has high tensile strength together with good hot water resistance, and to a process for producing the same.

The most required characteristics of the yarn using in the industrial field application such as tire cords, ropes, stitching threads, seat belts and fishing nets, is high tensile strength. In order to get a high tensile strength PVA yarn which is usable in the industrial field, U.S. Pat. Nos. 4,603,083 and 4,698,194 have been already proposed. As these PVA yarns proposed therein have a degree of polymerization of at least 1500, a tensile strength of at least 12 g/d and an initial modulus of at least 280 g/d, they are sufficient in mechanical properties, and usable in the industrial field application.

However, these PVA yarns have insufficient hot water resistance so that they melt down when they are used at high temperature in presence of water. So they are apparently better in tensile strength than conventional PVA yarns, but not entirely sufficient in the field of tire cord application which is required a stable reinforcing effect for a long period.

In order to improve hot water resistance of a PVA yarn, there has been already proposed some methods. For example, according to Japanese Patent Publication No. 46-11457, it is tried to improve the hot water resistance of a PVA yarn by mixing polyvinyl alcohol with boron compound to make the crosslinked structures between hydroxyl groups of polyvinyl alcohol and boron. However, the hot water resistance of the PVA yarn according to the above method was insufficient in the tire cord application which is used in very severe conditions.

SUMMARY OF THE INVENTION

It is an object of this invention to provide PVA yarn having a high level of hot water resistance as well as a high tensile strength.

It is another object of this invention to provide a PVA yarn having a high hot water resistance and tensile strength, particularly a good resistance to fatigue when it is used in tire cord.

It is still another object of this invention to provide a process for industrially producing such a PVA yarn having superior physical properties such as a high tensile strength and hot water resistance.

In order to carry out the above mentioned objects, the PVA yarn of this invention is composed of polyvinyl alcohol having a degree of polymerization of at least 1500, and has a tensile strength of at least 10 g/d and an index of hot water resistance of at least 50.

More concretely, this PVA yarn has the following characteristics such that saponification value of polyvinyl alcohol is at least 99 mol %, crosslinked structures are provided in hydroxyl groups of polyvinyl alcohol and the temperature difference in melting point peaks measured by DSC method is at least 20° C. The PVA yarn provided with the characteristics as mentioned above is produced by a process as described in detail hereinafter.

DETAILED DESCRIPTION OF THE INVENTION

There are two different methods to produce the PVA yarn of the present invention. The first one is to produce the PVA yarn by blending polyvinyl alcohol with special chemical compounds. Another one is to apply a cross-linking agent to an intermediate drawn PVA yarn which is drawn at a low draw ratio, regardless of blending polyvinyl alcohol with the above mentioned compounds.

In the former production process, polyvinyl alcohol having a degree of polymerization of at least 500 is blended with acrylic acid polymeric compounds, a solution of the polyvinyl alcohol solved by an organic solvent, its concentration being in the range of 2 to 30 wt %, preferably 5 to 25 wt %, is spun and the resultant filament yarn is drawn at a total draw ratio of at least 12 times.

Generally, as a high degree of polymerization gives a high tensile strength of the yarn, polyvinyl alcohol having a degree of polymerization of at least 1500, preferably at least 2500, more preferably at least 3500, is used in the present invention. And saponification value of the polyvinyl alcohol is at least 99 mol %. By using this kind of polyvinyl alcohol having a high degree of polymerization and high saponification value, the resulting yarn is able to have a tensile strength of at least 10 g/d, more preferably at least 14 g/d. And the high saponification value of at least 99 mol % gives the good water resistance together with a high tensile strength. Acrylic acid polymeric compound which is blended to polyvinyl alcohol is selected from the group of acrylic acid, methacrylic acid (alpha-methyl acrylic acid), ethacrylic acid (alpha-ethyl acrylic acid) and the polymer and oligomer of alkaline metal salts thereof. In so far as the solubility in a solvent is not largely spoiled, those polymers and oligomers in the main chains of which small amounts of olefinic monomers such as ethylene, propylene, styrene, itaconic acid and so on are copolymerized can be used. Moreover, so-called ionomers can be used, too.

There is no restriction for the degree of polymerization of the acrylic acid polymeric compound, but it is preferably in the range of 200 to 100,000, more preferably in the range of 200 to 50,000. When the degree of polymerization is too high, the dissolving property is reduced and sometimes it is difficult to handle.

The mixture ratio of the acrylic acid polymeric compound to the polyvinyl alcohol is controlled in the range of 0.1 to 40 wt % in the total polymer, preferably in the range of 0.1 to 20 wt %. If the mixture ratio is less than 0.1 wt %, it is difficult to get a sufficient hot water resistance; and if it is more than 40 wt %, sometimes it gives low tenacity.

Regarding the hot water resistance of the PVA yarn in this invention, it shows an index of hot water resistance (defined later) of at least 50, more preferably at least 60.

Regarding a spinning method of the above mentioned polymer solution, any of a wet spinning, a dry-jet wet spinning and a gel spinning is able to be adopted, specifically the dry-jet wet spinning or gel spinning is preferable. In order to get PVA yarns in the present invention whose tensile strength is 10 g/d or more, it is required that a total draw ratio is 12 times or more in a drawing process. To obtain yarns having a structure being capable of accepting such a high draw ratio, the dry-jet wet spinning and gel spinning are preferable. Namely, it is possible to obtain undrawn yarns having a dense structure and to draw them by a high draw ratio in the successive drawing process by spinning such PVA polymer of high degree of polymerization by means of the dry-jet wet spinning or gel spinning process. Consequently, it is possible to produce a high strength PVA yarn whose molecular orientation is very high and also crystallinity is high.

Now we describe a dry-jet wet spinning and gel spinning process which are used in the present invention.

The dry-jet wet spinning process is to extrude the polymer solution from a spinneret through a layer of air or inert gas such as nitrogen, and subsequently introduce to coagulate the spun filament yarns into a coagulating bath. In the present invention, the distance between the face of the spinneret and the liquid level of the coagulating bath is 2 to 200 mm, preferably 3 to 20 mm. The solvent for the polymer solution includes organic solvents such as dimethylsulfoxide (abbreviated as DMSO hereinafter), ethylene glycol, glycerin; and aqueous solution of inorganic salts such as zinc chloride, sodium thiocyanate, calcium chloride, aluminium chloride, boric acid; and mixture thereof. Preferable among them are DMSO and DMSO aqueous solution. A coagulating agent for the coagulating bath includes alcohol such as methanol, ethanol, buthanol; and acetone, benzene, toluene; and mixture of the above mentioned agent and DMSO, ethylene glycol, glycerin; and aqueous solutions of saturated inorganic salts.

The gel spinning process used in the present invention is to extrude the polymer solution into a cooling bath which has no miscibility with the spinning dope, through a spinneret which is set 2 to 200 mm, preferably 3 to 20 mm apart from the level of the cooling bath, and cool the spun filament yarn with keeping a concentration of the polymer practically to form a gel. For solvents for the polymer solution, are suitable those which make the gel formation by means of cooling of the polymer solution. For example, there are listed polyalcohol such as glycerin, ethylene glycol, propylene glycol, di-ethylene glycol, tri-ethylene glycol, tetra-ethylene glycol and tri-methyl propane; and the non-volatile solvents such as benzene sulfoamide and caprolactum. Among them, glycerin and ethylene glycol are preferable.

And for the cooling bath, suitable are those which have no miscibility with the above described spinning dope and are non-solvents for PVA polymer. For example, there are listed decarein, tri-chlorethylene, tetra-chlorethylene, paraffin oil.

In every spinning process, stability of the polymer solution is subjected by the pH of the solution. So it is needed to control the pH of the solution in the range of 5 to 11. If the pH is less than 5, ester exchange reaction proceeds between hydroxyl groups of polyvinyl alcohol and carboxylic acid groups of acrylic acid polymeric compound, and consequently the spinnability becomes poor with increase in the viscosity of the polymer solution. And if the pH is more than 11, the mechanical properties becomes lower because of the main chain scission of the polyvinyl alcohol.

After the coagulation or gelation, the spun yarn is washed by an extracting agent such as methanol and acetone, in order to remove the solvent, and subsequently the yarns are introduced to the drawing process. In this case, a multi-step process is preferable for the drawing process. After the above washing step it is better to draw the spun yarn at a draw ratio of 2 to 10 times, preferably 3 to 6 times in a methanol bath, and then introduce the yarn to a drying process. And it is still preferable to apply further drawing at a total draw ratio of at least 12 times in heating zone such as hot tube, hot roller, heating plate or fluidized bed at 200° to 260° C., in the heated air or nitrogen atmosphere, or in the heating liquid of at 200° to 260° C.

Then we describe another method to produce the PVA yarn having a good hot water resistance according to the invention. In this case, the preparation of the polymer solution and the spinning method are same as above mentioned in the first method. And for polyvinyl alcohol to be used in the second method, there is no limitation to use the acrylic acid polymeric compound which is blended to polyvinyl alcohol in the first method. The drawing process applied after the spinning process is applied a multi-step process, in which a cross-linking agent is added to an intermediate drawn yarn which is drawn at a low draw ratio and thereafter further drawing is applied under tension at high temperature until a total draw ratio becomes at least 12 times. In this process, it is required to draw the spun yarn at least 3.0 times, preferably at least 3.5 to 7.0 times prior to the application of the cross-linking agent. If the draw ratio is less than 3.0 times, the cross-linking agent penetrates into the yarn, consequently drawability and mechanical properties such as the tensile strength become lower because of the excess of the crosslinked structures.

Cross-linking agent is selected from the group of peroxide compounds such as hydroperoxide, di-alkylperoxide, peroxyketal and peroxyester; isocyanate compound, blocked isocyanate compound, urethane compound and epoxy compound. Also mixture of one or more compounds thereof is applicable. The procedures to give the cross-linking agent to the yarns are; to dip the yarn into the inorganic solvent solution or aqueous solution of said agent; to contact the yarn to the roller surface which makes coating membrane of said solution; or to spray the solution onto the yarn.

According to each method of said processes, it is possible to produce the PVA yarn having a tensile strength of at least 10 g/d, more preferably at least 14 g/d, and mechanical properties of the yarn are sufficient for industrial application. And the hydroxyl groups of polyvinyl alcohol composing the PVA yarn are blocked, namely, in the former case, to make the cross-linked structure with carboxyl groups of the acrylic acid polymeric compound, and in the latter case, to make it with added cross-linking agent. Moreover, the PVA yarn has a characteristic where a peak temperature difference in melting point $\Delta Tm$ measured by means of the below described DSC method becomes at least 20° C. These characteristics where crosslinked structures exist in the hydroxyl groups in the PVA polymer and the peak temperature difference in melting point $\Delta Tm$ measured by means of the DSC method is at least 20° C. are related with the hot water resistance of the PVA yarn and bring the index of hot water resistance to at least 50.

The PVA yarn having an index of hot water resistance of at least 50 has an excellent hot water resistance so that it is not melt down even in exposure in saturated steam of 120° C. and after exposure in 120° C. steam for 10 min., a strength retention of it is 50% or more.

This PVA yarn can be made into a tire cord having a cord tensile strength of at least 8.0 g/d, preferably at least 8.5 g/d, and a good GY fatigue life. As this tire cord shows also an excellent index of hot water resistance of at least 50, it increases extremely the reinforcing effect of a tire compared to a conventional PVA yarn. Also, a high tensile strength decreases fiber consumption and number of ply for the tire, so that it is possible to decrease the tire weight and fuel consumption.

The above mentioned tire cord is produced by a twisting process, in which a plurality of PVA yarns are twisted individually to a first twist, and then all of the first twisted PVA yarns are combined and twisted to a second twist into a tire cord. In the above twisting process, a twist factor [=(number of twist/10 cm)×(yarn denier×number of ply)$^{\frac{1}{2}}$] is set in the range of 500 to 2500, more preferably in the range of 900 to 2100. Generally, the twist factor of the tire cord has a some relation with the mechanical properties and the fatigue life. When the twist factor increases, the fatigue life becomes better, but on the other hand, the mechanical properties such as a strength and modulus become worse. Although the required properties of the tire cord differ depending on a portion used in the tire; generally, if the twist factor is less than 500, the fatigue life falls extremely and on the other hand if it is more than 2500, an effect to prevent a tire from deformation under loading increases because of the high medium elongation of the cord.

The cord twisted to the above twist factor is applied to a dipping process where it is treated by known adhesive agent such as resoccin-formalin-latex (abbreviated as RFL hereinafter) and epoxy resin, and then introduced to drying and heat-setting process. In preferable drying and heat-setting processes, a dipping treated tire cord is dried in a dry zone under conditions of a temperature of 100° to 160° C., preferably 110° to 150° C.; a setting time of 60 to 240 sec, preferably 90 to 180 sec; and a stretch ratio of 0 to 3%, preferably 0 to 2%, then heat-treated in a hot zone under conditions of a temperature of 160° to 240° C., preferably 170° to 220° C.; a setting time of 20 to 60 sec, preferably 30 to 50 sec; and a stretch ratio of 0 to 4%, preferably 1 to 3%, and finally further heat-treated in a normalization zone under conditions of a temperature of 160° to 240° C., preferably 170° to 220° C.; a setting time of 20 to 60 sec, preferably 30 to 50 sec; and a stretch ratio of −3 to 1%, preferably −2 to 0%.

The resultant tire cord has a cord tensile strength of at least 8.0 g/d, preferably at least 8.5 g/d, and an excellent fatigue life. Unfortunately, we could not find the mechanism of the improvement of the fatigue life. However, it is supposed that the acrylic acid polymeric compound or cross-linking agent makes the crosslinked structures mainly in the amorphous part of the PVA yarn by means of reaction of heating or acid, and it forms lateral directional bonding to the molecular chain axis of polyvinyl alcohol. In this reaction, a property of anti-compression improves and at the same time, fibrillation of the yarn is hard to occur by an external force.

The invention is now described in more detail with reference to the following examples. The measuring methods of the yarn and tire cord properties employed in the examples are measured according to the following description.

<Properties of the Yarn>

(1) Tensile Strength and Elongation

These properties are measured according to the method in JIS L-1017. At first, PVA yarn has been conditioned for 24 hours at 20° C. and 65% RH in the hank form. Then a 25 cm long specimen, which is twisted 10 turns/10 cm, is pulled at a rate of 30 cm/min on the "Tensilon" tester Model DTM-4L made by Toyo Baldwin Co. Ltd. As for chack of the tester, air jaw for the cord is used.

(2) An Index of Hot Water Resistance

One end of the specimen is fixed, and for the other end, the load of 0.15 to 0.20 g/d is added. Then applies the hot steam of 120° C. for 10 minutes to the center of the specimen. Then the specimen has been conditioned without tension for 48 hours at 20° C. and 65% RH. Then the tensile strength of this specimen (T1) is measured. On the other hand, the tensile strength of raw yarn (T0; without steaming) is also measured. An index of hot water resistance is defined as the following equation.

$$\text{An index of hot water resistance} = \frac{T1}{T0} \times 100$$

(3) Content of Acrylic Acid Polymeric Compound in the Fiber

The content is measured by calculating the area ratio of the methylene groups and carbonyl groups by means of $^{13}$C-NMR in $d^6$-DMSO and FT-IR spectrum.

(4) A Peak Temperature Difference in Melting Point ΔTm

The peak temperature difference in melting point ΔTm is measured by a DSC method as follows.
   Apparatus: Model DSC-2C made by Perkin-Elmer Co. Ltd.
   Conditions: sample weight; 1 mg rate of heating; 10° C./min. cell; standard vessel of aluminium atmosphere; in the nitrogen stream (30 ml/min)

ΔTm is the temperature difference between melting point peaks of the following two kinds of specimens, as defined in J. Polym. Sci., Polym. Phys. Ed., 15, 1507 (1977).

Type A: The specimen is inserted into the cell without tension.

Type B: The specimen is wound on the aluminium plate to avoid heat shrinkage and inserted into the cell.

ΔTm=(the peak temperature of Type A) −(the peak temperature of Type B)

(5) Small Angle X-Ray Scattering

The small angle X-ray scattering is measured under the following conditions according to the known method that employs a Kiessig camera.
   Apparatus: X-ray generator, Model RU-200, made by Rigaku Denki KK.
   CuKα line (with Ni filter)
   Output: 50 kV–150 mA
   0.3 mm collimator: transmission method
   Camera radius: about 400 mm
   Exposure: 90 minutes
   Film: Kodak no-screen type <Properties of the Cord>

(1) Tensile Strength of the Cord

The cord tensile strength is measured same as for the yarn as above mentioned.

(2) Medium Elongation

The medium elongation is measured by reading the data of the load-elongation curve at following constant load. In case that the yarn denier is 1500, a constant load is 6.75 kg for 2-ply doubling yarn. And in case that the yarn denier and a number of ply is different, the following correction is done.

1000 denier×2-ply; medium elongation is read at 4.5 kg.
1000 denier×3-ply; medium elongation is read at 6.75 kg.
1800 denier×2-ply; medium elongation is read at 8.1 kg.

(3) GY Fatigue Life

The GY fatigue life is measured according to the method provided in JIS L-1017, 1321 (A method). In this case, the angle of the tube was lifted from 10° to 90° at the rate of 10°/30 min. And the life at 90° is measured as the GY fatigue life.

EXAMPLES 1 TO 6

Six kinds of polymer solution were made according to the following manner. A polyvinyl alcohol having a degree of polymerization of 3500 (saponification value of 99.9 mol %) was mixed with a 25 wt % aqueous solution of acrylic acid oligomer having a degree of polymerization of 400, at mixture ratios of 99.7/0.3 (Example 1), 98/2 (Example 2), 95/5 (Example 3), 90/10 (Example 4), 80/20 (Example 5) and 70/30 (Example 6) in each wt %, respectively and each of the above six kinds of mixed polymer was dissolved in DMSO to give a 15 wt % polymer solution.

Each of these polymer solution was extruded by a dry-jet wet spinning in which were employed a spinneret having 600 holes, each 0.08 mm in diameter and a coagulating bath of methanol containing 5 to 10 wt % DMSO. The distance between the face of the spinneret and the liquid level was 10 mm. The resulting spun yarns were washed with methanol to remove DMSO therefrom, then applied to a first step drawing of 4.0 times at a room temperature, and dried to remove methanol.

Then, they were further drawn 5.3 times at 245° C. in the air and six kinds of PVA yarns, each having a nominal denier of 1500, a number of filaments of 600 were obtained. In each yarn, a long-period pattern due to small-angle X-ray scattering was not observed.

TABLE 1 shows mechanical properties and the index of hot water resistance of these yarns. In each of six yarns, crosslinked structures between hydroxyl groups of PVA polymer and carboxy groups of acrylic acid polymers was observed. ΔTm of each yarn were also shown in TABLE 1.

Then, six kinds of raw cords having a first twist of 39 turns/10 cm, 2-ply second twist of 39 turns/10 cm were made from the above six kinds of the PVA yarns. These raw cords were treated by adding RFL type adhesive agent in "Computreater" made by Litzler Co. Ltd., and then dried and heat-set under a tension to obtain treated cords. The drying was done at 150° C. for 120 seconds under a constant length. And the heat-setting was done at 200° C. for 30 seconds under stretching of 3.5% as for heat-setting and at 200° C. for 30 seconds under relaxation of 0.5% as for normalization.

The characteristics of the resulting cords were shown in TABLE 3.

EXAMPLES 7 TO 9

Three kinds of PVA yarns having a degree of polymerization of 3500 (saponification value of 99.9 mol %), nominal denier of 1500 and number of filaments of 600 were made same as Example 1, except mixing with an aqueous solution of a polymethacrylic acid having a degree of polymerization of 300 so to make mixtures having ratios of 99.7/0.3 (Example 7), 98/2 (Example 8) and 80/20 (Example 9) each in wt %, respectively. In this case also, in each yarn, a long-period pattern due to small-angle X-ray scattering was not observed. And using these yarns, treated cords were made according to the same procedure as Example 1.

Mechanical properties and the index of hot water resistance are shown in TABLE 2. And in each of three yarns, crosslinked structures between hydroxyl groups of PVA polymer and carboxyl groups of methacrylic acid polymer were observed. ΔTm of each yarn is shown in TABLE 2. Characteristics of the treated cords are shown in TABLE 3.

EXAMPLE 10

A PVA yarn having a degree of polymerization of 3500 (saponification value of 99.9 mol %), nominal denier of 1500 and number of filaments of 600 were made same as Example 1, except for mixing with polyacrylic acid having a degree of polymerization of 50000 to make a mixture having a ratio of 98/2 in wt %. In this case also, a long-period pattern due to small-angle X-ray scattering was not observed. And using this yarn, a treated cord was made.

Mechanical properties and the index of hot water resistance are shown in TABLE 1. Crosslinked structures between hydroxyl groups of PVA polymer and carboxyl groups of acrylic acid polymeric compound was also observed. And ΔTm of the yarn is shown in TABLE 1. Characteristics of the treated cord are shown in TABLE 3.

EXAMPLE 11

A polyvinyl alcohol having a degree of polymerization of 3500 (saponification value of 99.9 mol %) was mixed with a 25% aqueous solution of acrylic acid oligomer having a degree of polymerization of 400 at a ratio of 98/2 in wt %, and the polymer mixture was dissolved in hot water including boric acid 2 wt % to give a 12 wt % polymer solution. This polymer solution was extruded by a dry-jet wet spinning in which was employed a spinneret having 600 holes, each 0.1 mm in diameter and a coagulating bath of aqueous solution containing caustic soda of 100 g/l and sulfuric acid of 100 g/l, the distance between the face of the spinneret and the liquid level of the coagulating bath being 10 mm. The resultant yarn was successively applied to a first step drawing of 4.0 times and then to a neutralization and washing step. Thereafter, the drawn yarn was removed the water adhered to the yarn surface in a bath of methanol and further dried. The drawn yarn was further applied to a second step drawing of 5.0 times at 245° C. in the air and oiled to become a multi-filament yarn of a nominal denier of 1500 and a number of filaments of 600. In the multi-filament yarn, a long-period pattern due to small-angle X-ray scattering was not observed. Using this yarn, a treated cord was made by the same procedure as Example 1.

Mechanical properties and the index of hot water resistance of this yarn are shown in TABLE 1. Crosslinked structures between the hydroxyl groups of PVA polymer and the carboxyl groups of acrylic acid oligomer were observed. And ΔTm of the yarn is shown in TABLE 1. Properties of the treated cord are shown in TABLE 3.

EXAMPLE 12

A polyvinyl alcohol having a degree of polymerization of 3800 (saponification value of 99.9 mol %) was dissolved in DMSO to give a 17 wt % polymer solution. This polymer solution was extruded by a dry-jet wet spinning in which employed a spinneret having 600 holes, each 0.08 mm in diameter and a coagulating bath of methanol containing 5 to 10 wt % DMSO, the distance between the face of the spinneret and the liquid level of the coagulating bath being 5 mm. The resulting yarn was applied to a first step drawing of 4.0 times at room temperature after washed with methanol to remove DMSO, and then dried to remove methanol.

Then, the first step drawn yarn was introduced into a treatment solution which contains cross-linking agent. As for the cross-linking agent, a methanol solution containing 6% of clemperhydroxide was used. The treated yarn was further drawn 5.2 times at 245° C. in the air, and thus PVA yarn having a nominal denier of 1500, a number of filaments of 600 and no long-period pattern due to small-angle X-ray scattering was obtained.

Mechanical properties and an index of hot water resistance are shown in TABLE 4. In this yarn, crosslinked structures was observed in the hydroxyl groups of the PVA polymer. And ΔTm of the yarn is shown in TABLE 1.

Comparative Example 1

A PVA yarn having a nominal denier of 1500 and a number of filaments of 600 was made by the same procedure as Example 9, except adding of acrylic acid polymeric compound.

Mechanical properties, an index of hot water resistance and ΔTm are shown in TABLE 1.

Comparative Example 2

A PVA yarn having a nominal denier of 1500 and a number of filaments of 600 was made by the same procedure as Example 12, except that the treatment by the cross-linking agent has not been done.

This yarn has not crosslinked structures in the hydroxyl groups of the PVA polymer. Mechanical properties, an index of hot water resistance and ΔTm are shown in TABLE 4.

Comparative Example 3

Characteristics of "Vinylon" yarn (Type 1800-1000-T5501, made by Kuraray Co. Ltd.) was measured for the reference. Crosslinked structures was observed in the hydroxyl groups of the PVA polymer. Mechanical properties, an index of hot water resistance and ΔTm are shown in TABLE 1. Especially, an index of hot water resistance was 0 (zero). That is, exposing in the steam at 120° C., "Vinylon" has melted down only in 8 minutes.

TABLE 1

| Level | ΔTm (°C.) | Denier (D) | Tensile strength (g/d) | Elongation (%) | An index of hot water resistance (—) |
|---|---|---|---|---|---|
| Example | | | | | |
| 1 | 23.2 | 1505 | 17.0 | 5.0 | 86 |
| 2 | 27.3 | 1519 | 17.1 | 5.1 | 88 |
| 3 | 28.1 | 1560 | 16.6 | 5.1 | 88 |
| 4 | 26.8 | 1620 | 16.2 | 5.1 | 75 |
| 5 | 27.2 | 1498 | 14.2 | 5.1 | 78 |
| 6 | 27.7 | 1523 | 12.5 | 5.5 | 70 |
| 10 | 22.1 | 1476 | 16.0 | 5.2 | 85 |
| 11 | 21.5 | 1502 | 16.2 | 5.1 | 65 |
| Comparative Example | | | | | |
| 1 | 18.7 | 1497 | 17.0 | 5.1 | 20 |
| 3 | 13.5 | 1769 | 10.8 | 6.7 | 0 (melt down) |

TABLE 2

| Level Example | ΔTm (°C.) | Denier (D) | Tensile strength (g/d) | Elongation (%) | An index of hot water resistance (—) |
|---|---|---|---|---|---|
| 7 | 24.4 | 1514 | 17.2 | 5.2 | 78 |
| 8 | 26.7 | 1497 | 17.1 | 5.1 | 86 |
| 9 | 27.1 | 1512 | 14.5 | 5.1 | 82 |

TABLE 3

| Level | Twist factor | Tensile strength (g/d) | Medium elongation (%) | GY Fatigue life (min) |
|---|---|---|---|---|
| Example | | | | |
| 1 | 2140 | 9.4 | 2.0 | 1540 |
| 2 | 2140 | 9.3 | 1.9 | 1680 |
| 3 | 2140 | 9.1 | 1.9 | 2200 |
| 4 | 2140 | 9.2 | 1.9 | 2040 |
| 5 | 2140 | 8.4 | 2.2 | 1280 |
| 6 | 2140 | 8.1 | 2.3 | 1120 |
| 7 | 2140 | 9.6 | 1.9 | 1400 |
| 8 | 2140 | 9.2 | 1.9 | 1700 |
| 9 | 2140 | 8.5 | 2.1 | 1260 |
| 10 | 2140 | 8.9 | 2.0 | 1800 |
| 11 | 2140 | 8.9 | 1.9 | 1250 |
| Comparative Example 1 | 2140 | 9.7 | 2.1 | 740 |

TABLE 4

| Level | ΔTm (°C.) | Denier (D) | Tensile strength (g/d) | Elongation (%) | An index of hot water resistance (—) |
|---|---|---|---|---|---|
| Example 12 | 20.2 | 1538 | 17.4 | 5.2 | 80 |
| Comparative Example 2 | 18.5 | 1530 | 17.3 | 5.1 | 25 |

What is claimed is:

1. A tire cord made of multifilament yarn of polyvinyl alcohol, wherein said multifilament yarn has a tensile strength of 12.5 to 17.4 g/d and an index of hot water resistance of 60 to 88, said multifilament yarn being produced from polyvinyl alcohol having a degree of polymerization of at least 1,500 and a degree of saponification of at least 99 mole %, wherein said polyvinyl alcohol has crosslinked structures formed through the hydroxyl groups of the polyvinyl alcohol, and each multifilament yarn is individually twisted to a first twist, a plurality of the obtained twisted multifilament yarns being twisted to a second twist into said tire cord.

2. A tire cord as in claim 1, wherein the sum of the twist factor in the first twist and the twist factor in the second twist is in the range of 500 to 2,500.

3. A tire cord as in claim 1, wherein said multifilament yarn has a melting point which satisfies the equation:

$$\Delta Tm \geq 20° C.$$

wherein $\Delta Tm$ is the difference between (1) the melting point peak measured by differential scan calorimetry without subjecting said multifilament yarn to tension and (2) the melting point peak measured by differential scan calorimetry with tension being applied to said multifilament yarn to avoid heat shrinkage.

4. A tire cord as in claim 1, wherein said polyvinyl alcohol is blended with an acrylic acid polymeric compound.

5. A tire cord as in claim 4, wherein said acrylic acid polymeric compound has a degree of polymerization in the range of 200 and 100,000.

6. A tire cord as in claim 4, wherein the ratio of said acrylic acid polymeric compound to said polyvinyl alcohol is 0.1 to 40% by weight.

7. A tire cord as in claim 4, wherein said acrylic acid polymeric compound is selected from the group consisting of: (1) polymers and oligomers of acrylic acid, methacrylic acid, ethacrylic acid and alkaline salts thereof; and (2) polymers and oligomers of acrylic acid, methacrylic acid, ethacrylic acid and alkaline salts thereof wherein the main chains of said polymers and oligomers contain olefinic monomers copolymerized therein.

8. A tire cord as in claim 1, wherein a tensile strength of the cord is at least 8.0 g/d.

9. A tire cord as in claim 1, wherein a tensile strength of the cord is from 8.0 to 9.6 g/d.

* * * * *